United States Patent Office 2,922,753
Patented Jan. 26, 1960

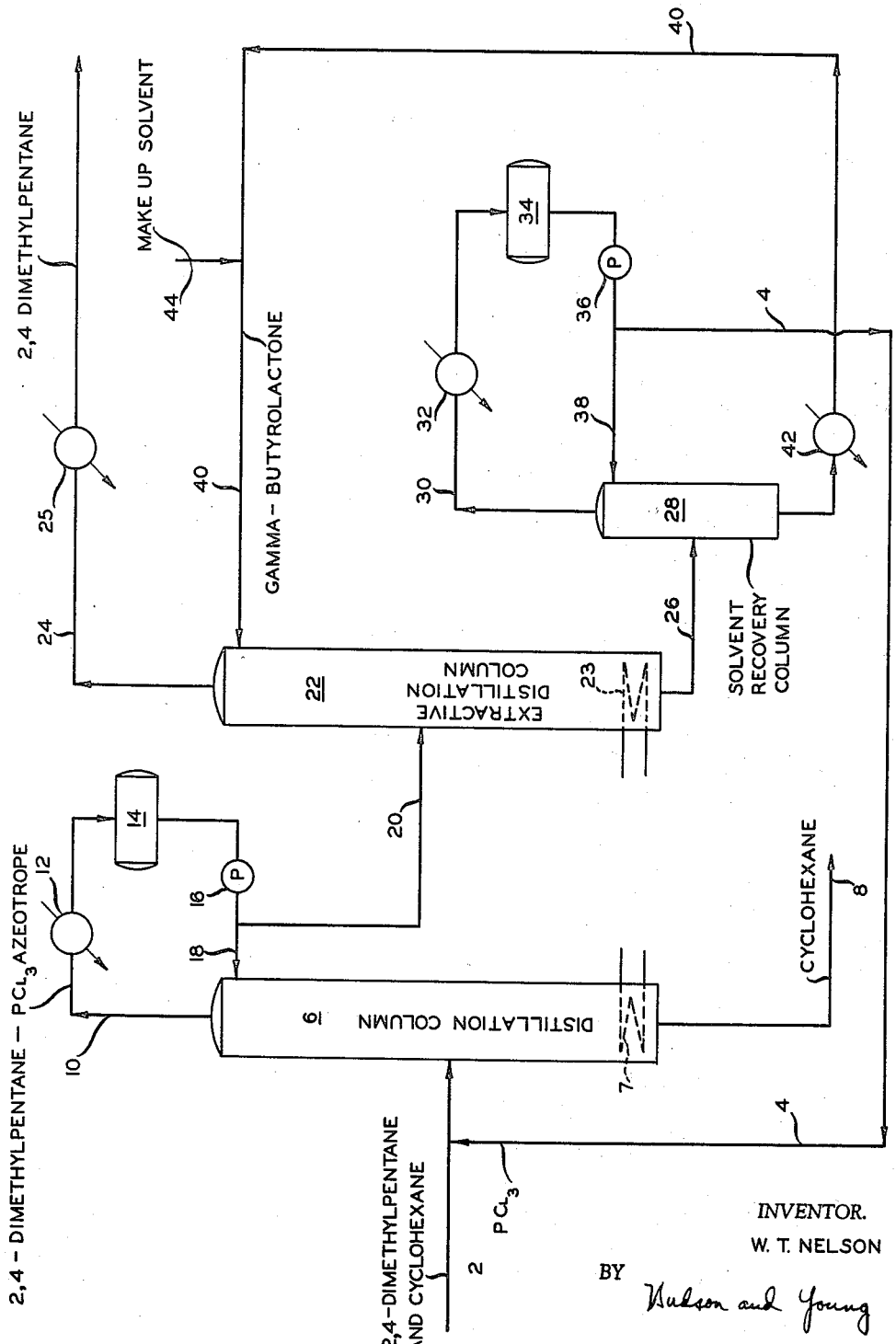

2,922,753

RESOLUTION OF PHOSPHORUS TRIHALIDE-HYDROCARBON AZEOTROPES

William T. Nelson, Bartlesville, Okla., assignor to Phillips Petroleum Company, a corporation of Delaware Application March 31, 1958, Serial No. 725,055

11 Claims. (Cl. 202—39.5)

This invention relates to the resolution of phosphorus trihalide-hydrocarbon azeotropes. In one aspect the invention relates to the separation of phosphorus trihalides from azeotropes of said trihalides with $C_7$ alkanes, such as 2,4-dimethylpentane, 2,2-dimethylpentane and 2,2,3-trimethylbutane.

The processes of azeotropic distillation and extractive distillation for separating a hydrocarbon component from another hydrocarbon component of substantially the same boiling point contained in a complex hydrocarbon mixture are well known. In these processes, the hydrocarbon mixture is fractionally distilled in the presence of an added substance (entrainer or solvent) which alters the relative volatilities of the hydrocarbon to such an extent that fractional distillation is feasible. The phosphorus trihalides have been found to be excellent entrainers for the separation of some close boiling hydrocarbons. For example, when a mixture of cyclohexane and 2,4-dimethylpentane is fractionally distilled in the presence of a sufficient amount of phosphorus trichloride, the phosphorus trichloride has been found to azeotrope with only the 2,4-dimethylpentane. In such an azeotrope distillation process, substantially pure cyclohexane is recovered as bottoms product and a mixture of phosphorus trichloride and 2,4-dimethylpentane distills overhead. A more detailed description of this specific process and azeotropic distillation in general is set forth in U.S. Patent 2,786,804 to W. T. Nelson.

One of the difficulties encountered in distillation processes wherein an added substance or entrainer is employed lies in the separation or recovery of the added substance from the hydrocarbons in the hydrocarbon fraction with which it associates itself. Ordinarily separation or recovery of the added substance or entrainer is effected by phase separation, solvent extraction, azeotropic distillation or extractive distillation processes. The separation of phosphorus trihalides from hydrocarbons by extractive distillation is somewhat difficult and can be expensive because of the reactivity of the phosphorus trihalides with many potential solvents. Thus, for example, water cannot be used in the separation since it readily reacts with the phosphorus trihalides.

It is an object of this invention to provide an improved process for the separation of phosphorus trihalides from azeotropic mixtures containing said trihalides and hydrocarbons.

Another object of the invention is to provide an improved process for the separation of phosphorus trihalides from azeotropes of said trihalides and $C_7$ alkanes.

Still another object of the invention is to provide an improved process for the resolution of the azeotrope phosphorus trichloride-2,2-dimethylpentane by extractive distillation.

The foregoing objects are achieved broadly by subjecting an azeotrope of a phosphorus trihalide and a hydrocarbon to extractive distillation in the presence of an aliphatic lactone.

In one aspect of the invention, a mixture of 2,4-dimethylpentane and cyclohexane is fractionally distilled in the presence of phosphorus trichloride. The resulting 2,4-dimethylpentane-phosphorus-trichloride azeotrope is contacted in an extractive distillation column countercurrently with gamma butyrolactone whereby the azeotrope is broken. Substantially pure 2,4-dimethylpentane is recovered as product from the extractive distillation step and the resulting mixture of lactone and trihalide is fractionated to recover each of these components, which are then recycled to the appropriate distillation columns.

The method of this invention finds application generally in the separation of azeotropes of hydrocarbons and phosphorus trihalides. Examples of specific hydrocarbon azeotropes which can be resolved include benzene-phosphorus trichloride, 2,4-dimethylpentane-phosphorus trichloride, normal hexane phosphorus trichloride, 2,3-dimethylpentane phosphorus trichloride and others. As previously mentioned, the azeotropes which are treated in the method of this invention are obtained as a result of the use of phosphorus trihalide in the resolution by fractional distillation of close-boiling hydrocarbon mixtures. The halides which form azeotropes include particularly phosphorus trichloride, phosphorus tribromide and phosphorus trifluoride. Phosphorus trifluoride and phosphorous pentafluoride are not ordinarily used in the separation of hydrocarbon mixtures because of their low boiling points. Phosphorus dichloride is very unstable and does not usually form azeotropes.

The lactones which are employed in carrying out the invention comprise in general lactones formed from aliphatic acids having 4 to 12 carbon atoms. Specific examples of suitable lactones include gamma butyrolactone, gamma valerolactone, delta valerolactone, caprolactone and homologues thereof. While any of the foregoing lactones can be used, gamma butyrolactone is preferred.

In carrying out the invention, the hydrocarbon-phosphorus trihalide azeotrope is contacted with lactone under suitable conditions whereby the azeotrope is broken. More usually, it is preferred to carry out the contacting step under countercurrent flow conditions in a conventional distillation tower, which can contain bubble-cap trays, perforated trays, baffles, packing or other suitable type of contacting arrangements. The extractive distillation process can be performed as a batch process; however, it is usually carried out as a continuous process with the lactone being introduced in the upper part of the extractive distillation column and flowing downwardly countercurrent to the azeotrope feed. The process can be carried out over a wide range of temperatures, namely at temperatures between about 100 and about 300° F.; and at pressures between about 5 and about 100 p.s.i.g., preferably about atmospheric. The amounts of lactone employed in the process will vary depending on the specific lactone employed and on the particular azeotrope being treated. Usually, it is desirable to provide in the extractive distillation column a sufficient quantity of lactone to provide a lactone-to-azeotrope ratio of between about 0.5:1 and about 20:1, and preferably between about 1:1 and about 5:1.

The hydrocarbon component of the azeotrope is usually removed overhead from the extractive distillation column and a mixture of lactone and phosphorus trihalide is removed from the lower portion of the column. This mixture can be treated by distillation to separate the lactone and trihalide, which can then be reused in the process.

In order to more clearly describe the invention and provide a better understanding thereof, reference is had to the accompanying drawing which is a diagrammatic illustration of a unit for separating hydrocarbons utilizing phosphorus trihalide, with further resolution of the resulting trihalide-hydrocarbon azeotrope in accordance with the method of this invention. Referring to the drawing, a mixture of 2,4-dimethylpentane and cyclohexane is combined through conduit 2 with phosphorus trichloride through conduit 4, the combined stream being introduced to distillation column 6. In this column, which can be a conventional bubble tray fractionating column, heat is introduced to the mixture from reboiler 7 whereby cyclohexane separates, passing from the bottom of the column through conduit 8 and an azeotrope is formed between dimethylpentane and phosphorus trichloride, said azeotrope passing overhead from the column through conduit 10. The azeotrope is condensed in condenser 12 and enters accumulator 14 from which it is withdrawn through pump 16, a portion being returned to the distillation column through conduit 18 as reflux and the remainder being introduced through conduit 20 to extractive distillation column 22. In this column which can also be a conventional bubble tray fractionating column, the azeotrope is contacted with gamma butyrolactone introduced in the upper portion of the column through conduit 40. Through the combined action of the solvent and heat introduced into the column through reboiler 23, the azeotrope is broken and a stream of substantially pure 2,4-dimethylpentane passes overhead from the column through conduit 24. The overhead vapors are condensed in condenser 25 and removed from the unit as product. The tower bottoms which comprise a mixture of gamma butyrolactone and phosphorus trichloride are removed through conduit 26 and introduced to solvent recovery column 28. In this column, the two components of the mixture are separated by fractional distillation, with the phosphorus trichloride passing overhead as a vapor through conduit 30. This material is condensed in condenser 32 and passes into accumulator 34. A portion of the accumulator contents are returned to column 28 as reflux through pump 36 and conduit 38 with the remainder being combined with the feed to distillation column 6 through conduit 4, as previously described. Gamma butyrolactone, which is removed from the bottom of the solvent recovery column, is passed through conduit 40 and cooler 42 and returned to extractive distillation column 22.

The preceding discussion has been directed to a specific embodiment of the invention; however, this is not to be taken in any limiting sense and it is within the scope of the invention to use other apparatus and processing arrangements for effecting contact between the lactone and azeotrope to provide resolution of said azeotrope.

The following example is presented in illustration of a preferred embodiment of the invention.

EXAMPLE

Two tests were run with the azeotrope phosphorus trichloride-2,4-dimethylpentane. In the first test, the azeotrope comprising 75 liquid volume percent phosphorus trichloride was heated to its boiling point, vapor was collected, condensed and analyzed to determine its composition.

In the second test a sample of the same azeotrope was combined with gamma butyrolactone (50 parts of azeotrope and 50 parts of latcone by volume). This mixture was heated to its boiling point and the vapor was collected, condensed and analyzed.

The results of the two tests are shown in the attached table.

Table

|  | Barometric Pressure, mm. Hg | Vapor | | Liquid | | $k=\frac{y}{x}$ | $\alpha^1$ |
|---|---|---|---|---|---|---|---|
|  |  | Comp., Vol. Percent | Temp., °C. | Comp., Vol. Percent | Temp., °C. |  |  |
| Case 1: |  |  |  |  |  |  |  |
| PCl₃ | 734 | 73.8 | 74.0 | 75.0 | 75.0 | 0.984 | 1.00 |
| 2,4-DMP |  | 26.2 |  | 25.0 |  | 1.05 | 1.07 |
| Case 2: |  |  |  |  |  |  |  |
| PCl₃ | 733 | 57.0 | 75.0 | 37.2 | 81 | 1.53 | 1.00 |
| 2,4-DMP |  | 43.0 | 75.5 | 12.4 | 82 | 3.47 | 2.27 |
| Gamma-Butyrolactone |  | 0 |  | 50.4 |  |  |  |

$^1$ α is separation factor.

The above tests illustrate the efficiency of gamma butyrolactone as a solvent for the separation of phosphorus trichloride and 2,4-dimethylpentane. The separation factor of 1.07 in Case 1 shows that the hydrocarbon-PCl₃ solution used was very close to the azeotrope composition (1.00 at the azeotrope composition). The composition of the hydrocarbon-PCl₃ solution was the same in Case 2 as in Case 1, and the separation factor 2.27 shows that gamma butyrolactone is very effective in breaking the azeotrope. The above data represent the equilibrium attained in one contacting stage. It will be realized by those skilled in the art that an increase in the number of contacting stages will result in the concentration of phosphorus trichloride in the bottoms product and an increase in the concentration of 2,4-dimethylpentane in the overhead product.

Having thus described the invention by providing a specific example thereof, it is to be understood that no undue limitations or restrictions are to be drawn by reason thereof and that many variations and modifications are within the scope of the invention.

I claim:

1. A process for the resolution of an azeotrope of a phosphorus trihalide and a hydrocarbon selected from the group consisting of aliphatic hydrocarbons containing 6 and 7 carbon atoms and benzene which comprises subjecting said azeotrope to extractive distillation in the presence of an aliphatic lactone selected from the group consisting of lactones formed from aliphatic acids having 4 to 12 carbon atoms.

2. The process of claim 1 in which the lactone is gamma butyrolactone.

3. The process of claim 1 in which the lactone is gamma valerolactone.

4. A process for the resolution of an azeotrope of a phosphorus trihalide and at least one C₇ alkane which comprises subjecting said azeotrope to extractive distillation in the presence of an aliphatic lactone selected from the group consisting of lactones formed from aliphatic acids having 4 to 12 carbon atoms.

5. The process of claim 4 in which the lactone is gamma butyrolactone.

6. The process of claim 4 in which the lactone is gamma valerolactone.

7. A process for the resolution of an azeotrope of phosphorus trichloride and 2,4-dimethylpentane which comprises subjecting said azeotrope to extractive distillation in the presence of an aliphatic lactone selected from the group consisting of lactones formed from aliphatic acids having 4 to 12 carbon atoms.

8. The process of claim 7 in which the extractive distillation is carried out in a temperature range between about 100 and about 300° F.

9. A process for the resolution of an azeotrope of phosphorus trichloride and 2,4-dimethylpentane which comprises subjecting said azeotrope to extractive distillation at a temperature in the range of about 100 and about 300° F. in the presence of gamma butyrolactone.

10. A process which comprises introducing a mixture of 2,4-dimethylpentane, cyclohexane, and phosphorus trichloride to a distillation zone, distilling said mixture under conditions to form an azeotrope of 2,4-dimethylpentane and phosphorus trichloride, contacting said azeotrope in an extractive distillation zone with gamma butyrolactone under azeotrope breaking conditions of temperature and pressure, recovering 2,4-dimethylpentane, passing a mixture of gamma butyrolactone and phosphorus trichloride to a solvent recovery zone, separating the components of the lactone-trichloride mixture in said zone by distillation, recycling recovered phosphorus trichloride to the distillation zone and recycling recovered gamma butyrolactone to the extractive distillation zone.

11. The process of claim 10 in which the extractive distillation step is carried out at a temperature between about 100 and about 300° F.

References Cited in the file of this patent
UNITED STATES PATENTS

| | | |
|---|---|---|
| 2,063,680 | Isham | Dec. 8, 1936 |
| 2,383,057 | Gross et al. | Aug. 21, 1945 |
| 2,736,691 | Nelson | Feb. 28, 1956 |
| 2,738,860 | Lorenz et al. | Mar. 20, 1956 |
| 2,786,804 | Nelson | Mar. 26, 1957 |
| 2,831,902 | Nelson | Apr. 22, 1958 |